US009702785B2

(12) United States Patent
Fujino

(10) Patent No.: US 9,702,785 B2
(45) Date of Patent: Jul. 11, 2017

(54) ENGINE FAILURE DIAGNOSIS SYSTEM AND WATERCRAFT HAVING THE SAME

(75) Inventor: Kenichi Fujino, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 1069 days.

(21) Appl. No.: 13/299,589

(22) Filed: Nov. 18, 2011

(65) Prior Publication Data
US 2012/0303209 A1   Nov. 29, 2012

Related U.S. Application Data

(63) Continuation of application No. 12/015,588, filed on Jan. 17, 2008, now abandoned.

(30) Foreign Application Priority Data

Jan. 17, 2007   (JP) ................. 2007-008013

(51) Int. Cl.
| | |
|---|---|
| G06F 11/30 | (2006.01) |
| G01M 17/00 | (2006.01) |
| G06F 7/00 | (2006.01) |
| G06F 19/00 | (2011.01) |
| G07C 5/00 | (2006.01) |
| G01M 15/05 | (2006.01) |

(52) U.S. Cl.
CPC .................. *G01M 15/05* (2013.01)

(58) Field of Classification Search
USPC ............................... 701/34.1, 29.1
See application file for complete search history.

(56) References Cited

U.S. PATENT DOCUMENTS 6,390,068 B1 * 5/2002 Hartke .............. F02D 41/1497
                                                       123/435
6,647,769 B1 * 11/2003 Fujino ................ F02B 61/045
                                                       73/114.41

(Continued)

FOREIGN PATENT DOCUMENTS

JP        05263679 A  * 10/1993

OTHER PUBLICATIONS

Fujino; "Engine Failure Diagnosis System and Watercraft Having the Same"; U.S. Appl. No. 12/015,588, filed Jan. 17, 2008.

*Primary Examiner* — Imran Mustafa
(74) *Attorney, Agent, or Firm* — Keating and Bennett, LLP

(57) ABSTRACT

An engine failure diagnosis system simply performs failure diagnosis of engine components, which are driven while an engine is operating, even at the time when the engine is stopped, and identifies a component that has failed and a location where a failure has occurred. The engine failure diagnosis system includes an ECM arranged to control an engine provided in an outboard motor of a watercraft. The ECM includes an actuation command section arranged to actuate engine components, which are driven while the engine is running, in a given manner, and a failure diagnosis section arranged to diagnose the presence of a failure in the engine components. The engine components of the engine are provided with actuated condition detecting sections arranged to detect a predetermined actuated condition. When the actuation command section outputs an actuation command while the engine is stopped, the engine components are actuated in a given manner.

19 Claims, 4 Drawing Sheets

(56) References Cited

U.S. PATENT DOCUMENTS

| | | | | |
|---|---|---|---|---|
| 2001/0047232 A1* | 11/2001 | Kanno | ................. | F02B 61/045 |
| | | | | 701/32.6 |
| 2001/0049579 A1* | 12/2001 | Fujino | .................. | G01M 15/04 |
| | | | | 701/114 |
| 2003/0060952 A1* | 3/2003 | Kanno | ............... | G05B 23/0235 |
| | | | | 701/32.7 |
| 2003/0182085 A1* | 9/2003 | Quinnett | ................... | F01P 3/12 |
| | | | | 702/185 |
| 2003/0195680 A1* | 10/2003 | Pillar | ................... | G01M 17/00 |
| | | | | 701/31.4 |

* cited by examiner

ENGINE FAILURE DIAGNOSIS SYSTEM AND WATERCRAFT HAVING THE SAME

BACKGROUND OF THE INVENTION

1. Field of the Invention

The present invention relates to a system for diagnosing a failure that occurs in an engine component.

2. Description of the Related Art

A conventional type of such engine failure diagnosis system is disclosed in JP-Y-Hei 5-11331 and JP-A-2001-193542. More specifically, in JP-Y-Hei 5-11331, an engine failure diagnosis system is activated by inserting a spare fuse into a terminal to energize circuits for sensors and electric components of the engine. The engine failure diagnosis system is designed to diagnose a failure that has occurred in the sensors or electric components, and indicates the diagnosis result by turning an alarm lamp ON.

In JP-A-2001-193542, an engine failure diagnosis system is designed to use a PC. The PC is connected to an engine control unit (ECU). Sensors provide the ECU with operating condition data concerning engine components which are driven while the engine is running. The engine failure diagnosis system obtains the operating condition data and displays the data on a screen of the PC.

However, the system described in JP-Y-Hei 5-11331 is designed to perform failure diagnosis by checking an electrical condition, such as energization. This allows the failure diagnosis of a member to be energized when in use, such as a sensor and an electric component. In contrast, the failure diagnosis is difficult to perform for the engine components that are driven while the engine is running, such as an injector, a fuel pump, and a valve. Especially, the failure diagnosis is difficult to perform at the time when the engine is stopped.

The system described in JP-A-2001-193542 is designed to display the operating condition data on the PC screen in order to provide information to estimate a location where a failure has occurred in the engine components. However, the operating condition data can be only obtained while the engine is running, and thus this system is only usable while the engine is running. In addition, the systems described in JP-A-2001-193542 and JP-A-2001-123918 are carried out by at least connecting the PC to the ECU. It is thus time consuming to start failure diagnosis. At the same time, these systems cannot be used in locations where a PC is not available for use, which imposes a constraint on the possible repair environments.

SUMMARY OF THE INVENTION

In order to overcome the problems described above, preferred embodiments of the present invention provide an engine failure diagnosis system which simply performs failure diagnosis of an engine component, to be driven while an engine is running, even at the time when the engine is stopped, and which identifies a component that has failed and a location where a failure has occurred.

An engine failure diagnosis system according to a preferred embodiment of the present invention includes a control module arranged to control operation of an engine and to drive engine components while the engine is operating, an actuation command section provided in the control module and arranged to output an actuation command for any of the engine components to be actuated even while the engine is stopped; an actuated condition detecting section arranged to detect an actuated condition of the engine component actuated based on the actuation command outputted by the actuation command section; and a failure diagnosis section provided in the control module and arranged to diagnose the presence of a failure in the engine component based on a detection result from the actuated condition detecting section.

Based on the one actuation command, the actuation command section preferably actuates the plural engine components simultaneously.

Alternatively, based on the one actuation command, the actuation command section may also preferably actuate the plural engine components in sequence in a certain order.

The actuation command section preferably selects the engine component to be actuated among the plural engine components based on the number of times the actuation command is outputted.

A switch mechanism preferably is provided to a wire harness connected to the control module, and an electrical connection condition of the wire harness is changed by turning the switch mechanism ON or OFF, in order to allow the actuation command section to output the actuation command.

According to another preferred embodiment of the present invention, a watercraft includes an engine failure diagnosis system according to any of the above-described preferred embodiments.

According to a preferred embodiment of the present invention, the actuation command section outputs an actuation command for any of the engine components to be actuated in a given manner while the engine is stopped. The actuated condition detecting section detects an actuated condition of the engine component actuated based on the actuation command outputted by the actuation command section. Based on the detection result from the actuated condition detecting section, the failure diagnosis section diagnoses the presence of a failure in the engine component. This allows the engine component to be actuated in a given manner, even while the engine is stopped, thereby performing failure diagnosis of the subject engine component. In addition, the actuation command section and the failure diagnosis section preferably are provided in the control module which drives and controls the engine. This allows the failure diagnosis to be performed without connecting external equipment for diagnosis, such as a PC, to the control module. Thus, no complicated procedures are involved, but quick failure diagnosis is achieved. Thereby, the failure diagnosis of the engine components, which are driven while the engine is operating, is performed simply even at the time when the engine is stopped, allowing for quick and easy identification of a component that has failed and a location where a failure has occurred.

Based on the one actuation command, the actuation command section preferably actuates the plural engine components simultaneously. Thus, the failure diagnosis is immediately completed, independent of the number of the engine components to be diagnosed. This further facilitates the failure diagnosis of the engine components.

Alternatively, based on the one actuation command, the actuation command section preferably actuates the plural engine components in sequence in a certain order. Therefore, implementing the failure diagnosis for the individual "engine components" improves accuracy of the diagnosis results, achieving reliable failure diagnosis of the engine components.

The actuation command section preferably selects the particular actuated condition detecting section to be actuated based on the number of times the actuation command is outputted. This allows the actuation command to be sent only to a specific engine component to realize failure diagnosis of the specific engine component. Thus, the failure diagnosis is immediately completed in such a case that a location where a failure has occurred is estimated in advance, thereby improving the convenience of users who perform failure diagnosis of engine components.

An electrical connection condition of the wire harness is preferably changed by turning ON or OFF the switch mechanism connected to the wire harness in order to allow the actuation command section to output the actuation command. Thus, the switch mechanism has a simple construction, while operation of the actuation command section is ensured.

In the watercraft according to another preferred embodiment of the present invention, the failure diagnosis of the engine components, which are driven while the engine is operating, is performed simply even at the time when the engine is stopped, thus allowing for accurate and easy identification of a failure component and a location where a failure has occurred.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIGS. 4A and 4B illustrate a failure location indicating display of the watercraft according to a preferred embodiment of the present invention, in which FIG. 4A is an image of the display when failure diagnosis is in progress, and FIG. 4B is an image of the display when the failure diagnosis is completed.

DETAILED DESCRIPTION OF PREFERRED EMBODIMENTS

Preferred embodiments of the present invention will now be described with reference to the attached figures.

FIGS. 1 to 4B illustrate preferred embodiments of the present invention.

Figure 1:
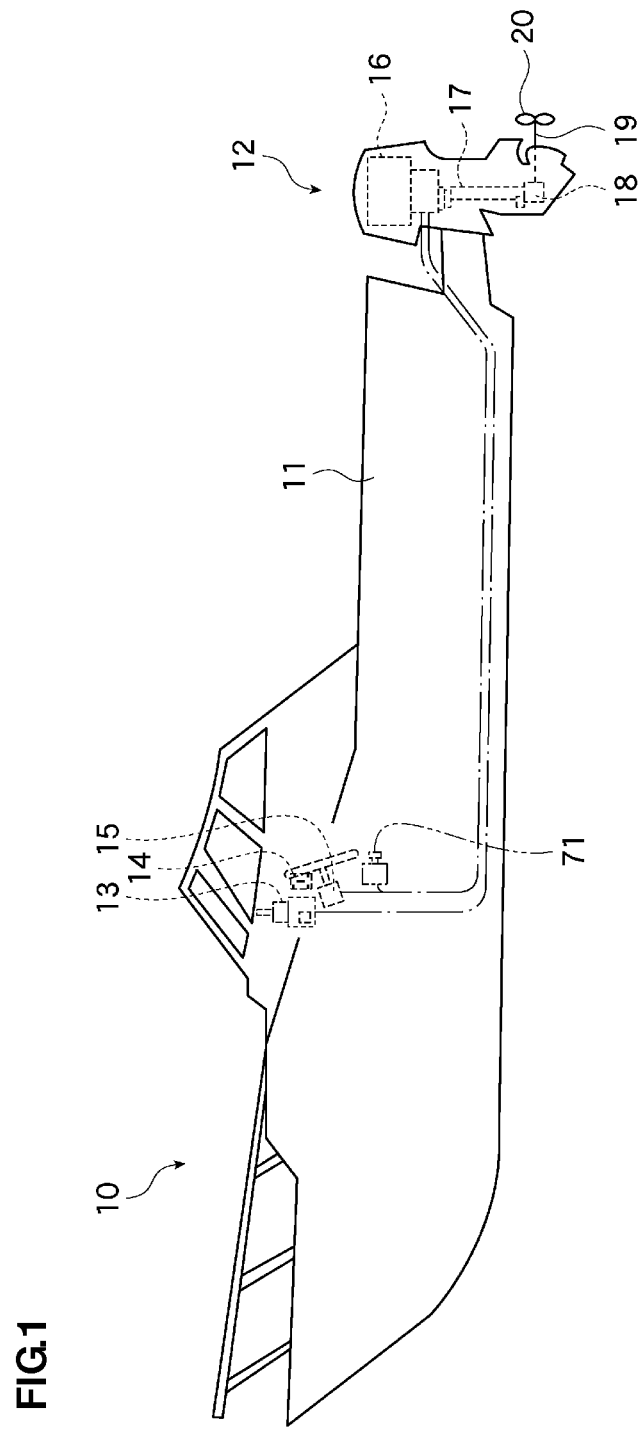
FIG. 1 is a side view of a watercraft according to a preferred embodiment of the present invention.

A description is first made of a construction according to a preferred embodiment of the present invention. As shown in FIG. 1, the engine failure diagnosis system according to this preferred embodiment is used for a watercraft 10 having an outboard motor 12 as a "watercraft propulsion unit" at a stern of a hull 11. The outboard motor 12 is controlled by a remote control unit 13, a key switch 14, a steering wheel unit 15, and so forth, which are located at an operator's seat of the hull 11.

As shown in FIG. 1, the outboard motor 12 has an engine 16 provided in its upper part. An output of the engine 16 is transmitted through a drive shaft 17, a shifting device 18, and a propeller shaft 19 to rotate a propeller 20.

Figure 2:
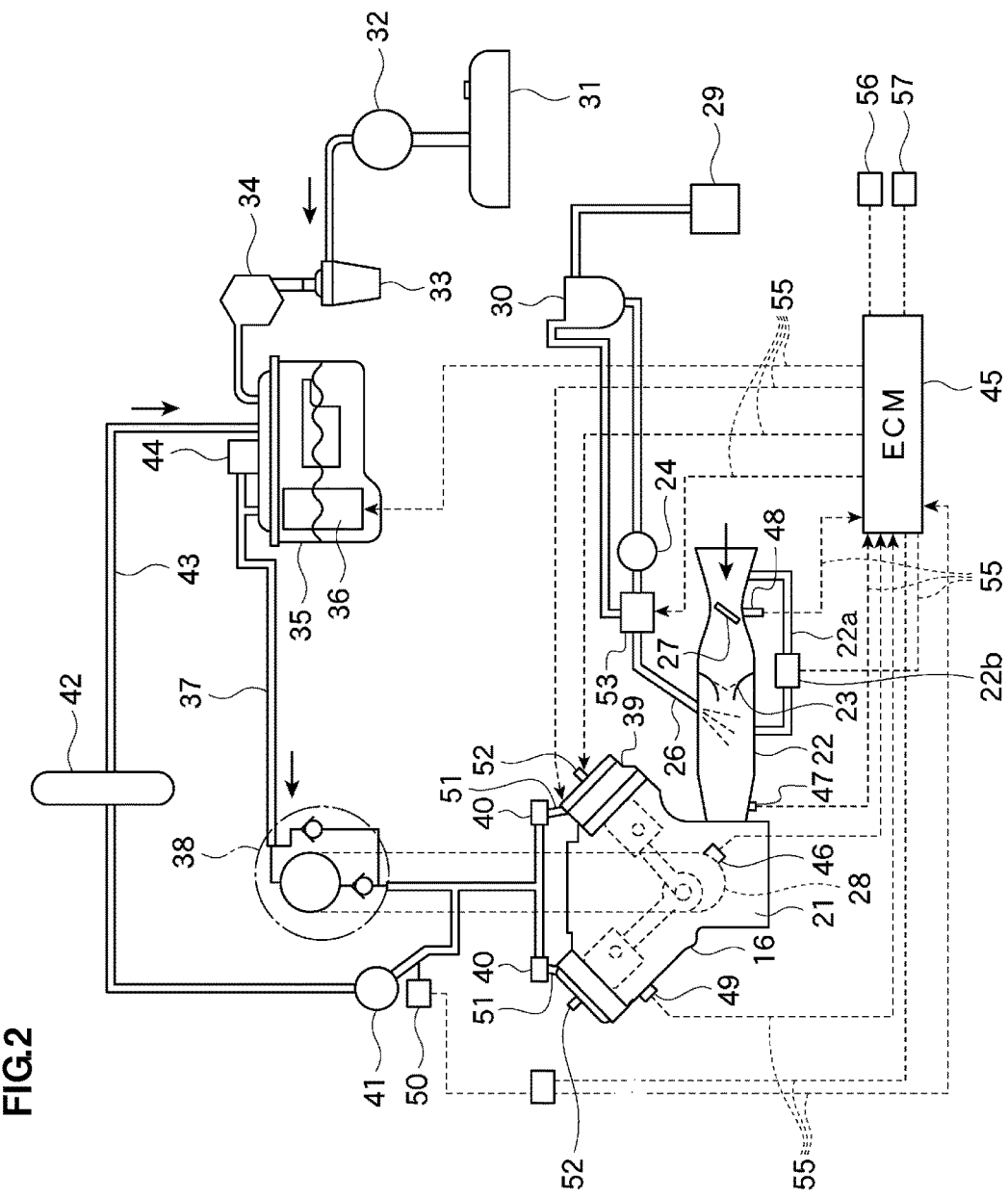
FIG. 2 is a block diagram illustrating a configuration of an engine of the watercraft according to a preferred embodiment of the present invention.

As shown in FIG. 2, the engine 16 preferably is a two-stroke, V-shaped six-cylinder engine, for example. An intake pipe 22 is connected to a crankcase 21 of the engine 16. A lead valve 23 is provided midway of the intake pipe 22. An electromagnetic solenoid valve 53 and an oil pump 24 for supplying oil within the engine 16 are connected to the intake pipe 22 on the downstream side of the lead valve 23 via an oil supply pipe 26. A throttle valve 27 is disposed on the upstream side of the lead valve 23. The oil pump 24 is designed to be actuated by rotating the crankshaft 28 of the engine 16, and supply oil from a sub tank 29 via a main tank 30 to the intake pipe 22. A second intake pipe 22a is separated from the middle of the intake pipe 22, the second intake pipe 22a being used for adjusting an idle engine speed of the engine 16. An intake valve 22b is provided within the second intake pipe 22a.

A fuel tank 31 is provided on the side of the hull 11. Fuel reserved in the fuel tank 31 is delivered from a first low-pressure fuel pump 32 through a filter 33 to a second low-pressure fuel pump 34 provided on the side of the outboard motor 12. The fuel is further delivered to a vapor separator tank 35. In the vapor separator tank 35, a fuel booster pump 36, which is actuated by an electric motor, is disposed. The fuel booster pump 36 boosts the fuel pressure, and delivers the fuel to a high-pressure fuel pump 38 through a booster pipe 37.

In the engine 16, a fuel supply rail 40 is fixed to a cylinder head 39 of each bank in a vertical direction (a direction perpendicular to a drawing sheet of FIG. 2). The fuel supply rail 40 is connected to the high-pressure fuel pump 38 on its discharge side, while being connected to the vapor separator tank 35 through a high-pressure pressure regulating valve 41, a fuel cooler 42, and a return pipe 43. A booster pressure regulating valve 44 is provided between the booster pipe 37 and the vapor separator tank 35.

The high-pressure fuel pump 38 is actuated by the crankshaft 28. Fuel reserved in the vapor separator tank 35 is pre-compressed by the fuel booster pump 36. The pre-compressed fuel is pressurized to a predetermined pressure by the high-pressure fuel pump 38. The pressurized high-pressure fuel is injected by an injector 51 attached to each cylinder of the engine 16 through the fuel supply rail 40 into each cylinder. This fuel is ignited by an ignition plug 52 to be burned. Excess fuel is returned through the high-pressure pressure regulating valve 41, the fuel cooler 42, and the return pipe 43 into the vapor separator tank 35.

Figure 3:
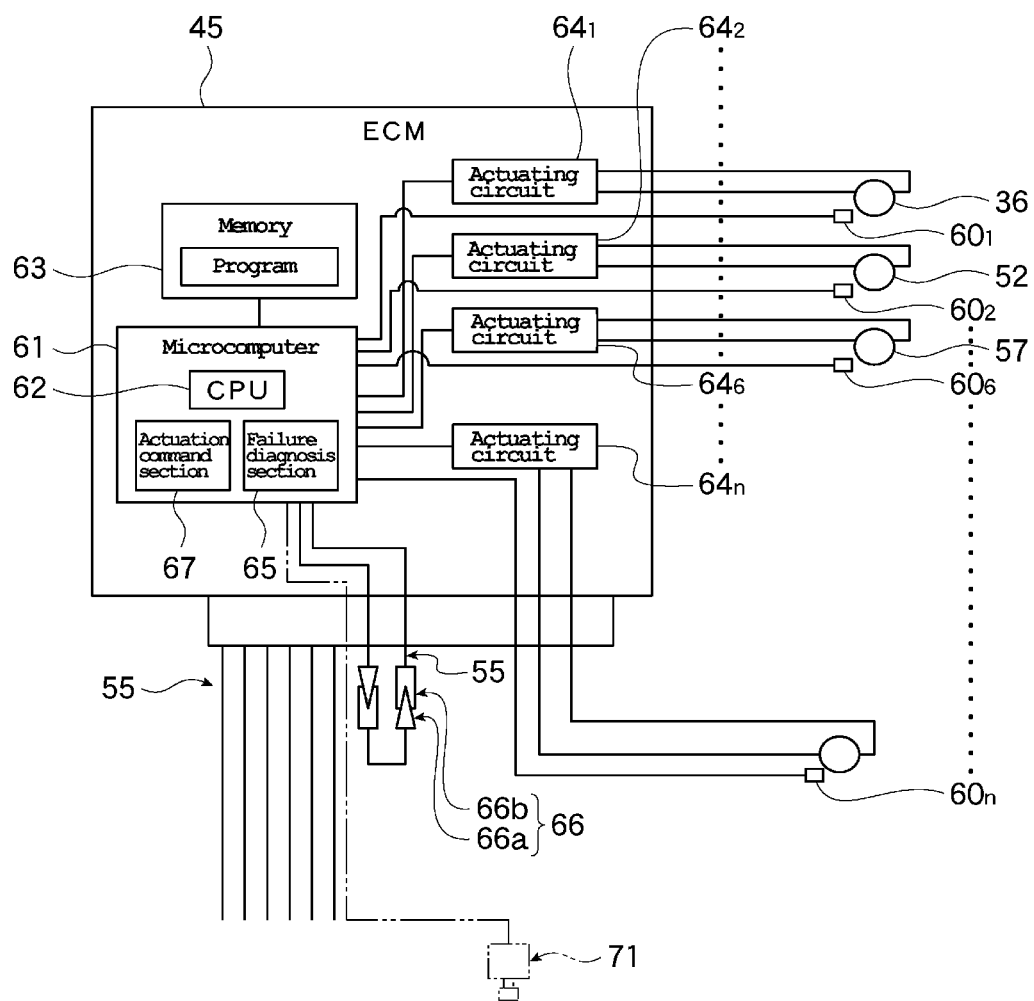
FIG. 3 is a function block diagram of an ECM and its peripheral components in the watercraft according to a preferred embodiment of the present invention.

"Engine components," which are driven while the engine 16 is running, form the engine 16. The n (n>1) number of "engine components" are provided with the n number of actuated condition detecting sections $60_1$, $60_2$, ... $60_n$ as "actuated condition detecting sections" for detecting an actuated condition. To be more specific, as shown in FIG. 3, there are provided a sound sensor $60_1$ arranged to detect an operating sound of the fuel booster pump 36 (a click sound generated when the fuel booster pump 36 starts to be energized and stops to be de=energized), a light sensor $60_2$ arranged to detect an ignition light of the ignition plug 52, a sound sensor $60_3$ arranged to detect an operating sound of the injector 51 (a click sound generated when the injector 51 starts be energized and stops to be de-energized), and a first electric current sensor $60_4$ arranged to detect an energized state of the intake valve 22b. There are further provided a second electric current sensor $60_5$ arranged to detect an energized state of an alarm LED 56, and a third electric current sensor $60_6$ arranged to detect an energized state of an alarm buzzer 57. The alarm LED 56 and the alarm buzzer 57 will be discussed later.

Not only the aforementioned sensors, the "actuated condition detecting sections" may also include a throttle opening sensor 48 arranged to detect an opening (throttle opening) of the throttle valve 27, an air-fuel ratio sensor 49 arranged to detect an air-fuel ratio (A/F) of a fuel mixture, and a fuel pressure sensor 50 arranged to detect a pressure of high-pressure fuel.

In an interior of the outboard motor 12, an engine control module (hereinafter referred to as ECM) 45 is provided as a control module. The ECM 45 receives detection signals outputted from the actuated condition detecting sections $60_1$, $60_2 \ldots 60_n$ through a wire harness 55 disposed in the hull 11 and the outboard motor 12.

As shown in FIG. 3, the ECM 45 includes at least one microcomputer 61. The microcomputer 61 includes a CPU 62. The CPU 62 executes a program stored in a memory 63, such as read only memory (ROM, not shown) and erasable programmable read only memory (EPROM, not shown), in a random access memory (RAM) as a working area. The CPU 62 then computes the detection signals inputted from the respective sensors 46 to 50, and sends control signals respectively to the injector 51, the ignition plug 52, the electromagnetic solenoid valve 53, the fuel booster pump 36 and so forth, in order to actuate these components.

The n number of actuating circuits $64_1$, $64_2$, ... $64_n$ are connected to the microcomputer 61 included in the ECM 45. The actuating circuits $64_1$, $64_2$, ... $64_n$ are preferably constituted with a hardware logic and so forth, and output a signal to the respective "engine components" such that each "engine component" is actuated in a given manner while the engine 16 is stopped.

A diagnosis start switch 66 as a "switch mechanism" is connected to a portion of the wire harness 55 connected to the microcomputer 61 in the ECM 45. The diagnosis start switch 66 includes a male connector 66a and a female connector 66b, which are provided to the portion of the wire harness 55 and connectable to each other. The male connector 66a and the female connector 66b are connected or disconnected by operator's manual operation.

When the diagnosis start switch 66 is in a disconnected state, the wire harness 55 connected to the diagnosis start switch 66 changes from a connected state where a signal is transmittable to a disconnected state where a signal is not transmittable. As will be discussed later, change of signal continuity in the wire harness 55 is utilized to allow an actuation command section in the ECM 45 to output an actuation command signal. In other words, using such simply-constructed connectors, the diagnosis start switch 66 ensures that the actuation command section operates and outputs the actuation command signal.

Alternatively, other than those connectors, the diagnosis start switch 66 may be any member as long as the member changes signal continuity in the wire harness 55. For example, an opened/closed switch with a relay circuit may be used. Further alternatively, the diagnosis start switch 66 may be formed together with a diagnosis start button 71 into one in order to further simplify the construction.

Functional sections are provided in the ECM 45, including an actuation command section 67 and a failure diagnosis section 65. These functional sections may be formed by executing the programs in the CPU 62.

The actuation command section 67 outputs an actuation command signal as an "actuation command" to allow the specific "engine components" to be actuated in a given manner. In other words, when the diagnosis start switch 66 is kept opened for a predetermined period of time, the actuation command section 67 outputs an actuation command signal to the actuating circuits $64_1$, $64_2$, ... $64_n$. These actuating circuits $64_1$, $64_2$, ... $64_n$, which receive the actuation command signal, output a command signal to the specific "engine components" to actuate in a given manner.

The failure diagnosis section 65 diagnoses the presence of a failure in the aforementioned "engine components" based on the detection results from the actuated condition detecting sections $60_1$, $60_2$, ..., $60_n$.

On a front panel at the operator's seat on the hull 11, not only a speed meter, a tachometer, and other meters, but also the alarm LED 56, and the alarm buzzer 57 are provided as the "engine components." The alarm LED 56 is designed to light up when the actuated condition detecting sections $60_1$, $60_2$, ..., $60_n$ detect an operation failure in the engine 16 or the like. The alarm buzzer 57 is designed to generate an alarm sound when the alarm LED 56 lights up.

Figure 4A:
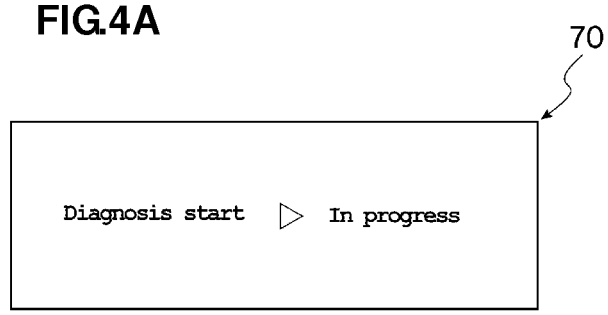
Figure 4B:
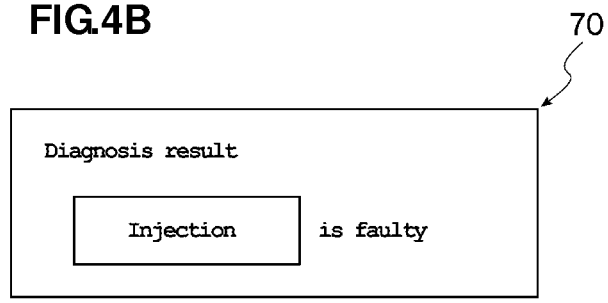

Further, on the front panel at the operator's seat, a failure location indicating display 70 is provided whose images are shown in FIGS. 4A and 4B. The failure location indicating display 70 preferably is constituted by a liquid crystal display (LCD) and so forth. A screen of the failure location indicating display 70 is formed such that the operator can visually recognize which "engine component" is diagnosed as having failed by the failure diagnosis section 65.

Now, the functions according to preferred embodiments of the present invention are described. The actuated condition detecting sections $60_1$, $60_2$, ..., $60_n$, the actuating circuits $64_1$, $64_2$, ..., $64_n$, and the "engine components" preferably have common configurations, respectively. Unless there is a need to distinguish from one another, the actuated condition detecting sections $60_1$, $60_2$, ..., $60_n$ are simply referred to as an actuated condition detecting section 60, while the actuating circuits $64_1$, $64_2$, ..., $64_n$ are simply referred to as an actuating circuit 64.

For example, when the engine 16 is stopped while the watercraft 10 is anchored or while a failure occurs in the engine 16 during cruising, the operator or occupant of the watercraft 10 manually operates the diagnosis start switch 66 to connect and disconnect the male connector 66a and the female connector 66b. When the male connector 66a and the female connector 66b are maintained in a disconnected state for a predetermined period of time, signal continuity in the wire harness 55 connected to the diagnosis start switch 66 changes. When the ECM 45 detects the change of signal continuity in the wire harness 55, the actuation command section 67 outputs an actuation command signal respectively to a portion of or all the actuating circuits $64_1$, $64_2$, ..., $64_n$ for the specific "engine components." Specifically, the actuating circuits $64_1$, $64_2$, ..., $64_n$ operate in any of the patterns 1 to 3 described below based on the actuation command signal.

Pattern 1

Based on one actuation command signal outputted by the actuation command section 67, all the actuating circuits $64_1$, $64_2$, ..., $64_n$ output a command signal to actuate the n number of "engine components" simultaneously. The n number of "engine components," to which the command signal is inputted, are individually actuated in a given manner. When detecting the actuated conditions, the actuated condition detecting sections $60_1$, $60_2$, ..., $60_n$ output a detection signal to the failure diagnosis section 65. In the pattern 1, the one actuation command signal causes the plural "engine components" to be actuated simultaneously. Thus, the failure diagnosis is immediately completed, independent of the number of "engine components" to be diagnosed.

Pattern 2

Based on one actuation command signal outputted by the actuation command section 67, the actuating circuits $64_1$, $64_2, \ldots, 64_n$ sequentially output a command signal individually to the n number of "engine components" to be actuated. More specifically, the actuating circuit $64_1$ first outputs a command signal (intermittent energization or continuing electric current) to actuate the fuel booster pump 36. When detecting a click sound generated due to the actuated condition of the fuel booster pump 36, the sound sensor $60_1$ outputs a detection signal to the failure diagnosis section 65. When the failure diagnosis section 65 outputs the detection signal and completes a failure diagnosis (to be discussed later), the next actuating circuit $64_2$ outputs a command signal (intermittent energization) to actuate the ignition plug 52. The rest of the procedure is the same as described. Such procedure is implemented for all the "engine components." In the pattern 2, the one actuation command causes the plural "engine components" to be actuated in sequence in a certain order. Thus, implementing the failure diagnosis for the individual "engine components" improves accuracy of the diagnosis results.

Pattern 3

Based on one actuation command signal outputted by the actuation command section 67, a specific actuation circuit 64 alone outputs a command signal to only a specific "engine component," such as the fuel booster pump 36, to be actuated. When detecting the actuated condition of the fuel booster pump 36, the actuated condition detecting section $60_2$ outputs a detection signal to the failure diagnosis section 65.

In the pattern 3, the actuation command section 67 selects the actuating circuit 64 for outputting an actuation signal based on the number of times the actuation command signal is outputted. For example, when the actuation command signal is outputted once, the actuation command section 67 outputs a command signal to the actuating circuit $64_2$ for outputting a command signal to the fuel booster pump 36. When the actuation command signals are outputted twice, the actuation command section 67 outputs a command signal to the actuating circuit $64_2$ for outputting a command signal to the injector 51. In this manner, the actuation command section 67 continues to operate. This allows to select the actuated condition detecting section 60 to be actuated in accordance with the number of actuation commands outputted, and therefore, allows to send an actuation command to a specific "engine component" to realize failure diagnosis of the specific "engine component." Thus, the failure diagnosis is immediately completed in such a case that a location where a failure has occurred is estimated in advance.

In the pattern 3, the number of times the actuation command section 67 outputs an actuation command signal is determined based on the number of times the male connector 66a and the female connector 66b of the diagnosis start switch 66 change between disconnected state and connected state. More specifically, if the operator performs disconnection operation once so that the male connector 66a and the female connector 66b are in a disconnected state once, the actuation command section 67 outputs an actuation command signal once. Also, if the operator performs disconnection operation twice so that the male connector 66a and the female connector 66b are in a disconnected state twice, the actuation command section 67 outputs an actuation command signal twice. In this manner, the actuation command section 67 continues to operate. This allows the actuated condition detecting section 60 to be selected based on the number of times the male connector 66a and the female connector 66b change between disconnected state and connected state, the actuated condition detecting section 60 being actuated by opening or closing a part of the wire harness 55. This also allows to simply form a mechanism for selecting a specific "engine component" to be diagnosed, while ensuring that a desired "engine component" is selected with simple operation.

In the above patterns 1 to 3, each "engine component" is actuated in its individually given manner based on the command signal. For example, the fuel booster pump 36 is opened or closed repeatedly a predetermined number of times, while the injector 51 is actuated a predetermined number of times. Also, the intake valve 22b, the alarm LED 56, and the alarm buzzer 57 are kept energized for a predetermined period of time.

Based on these actuations, the actuated condition detecting sections $60_1, 60_2, \ldots, 60_n$, provided for the respective "engine components," detect an actuated condition of each engine component. For example, the sound sensor $60_1$, provided for the fuel booster pump 36, detects an opening or closing sound (click sound). Also, the light sensor $60_2$, provided for the ignition plug 52, detects an ignition light. The sound sensor $60_3$, provided for the injector 51, detects an opening or closing sound (click sound) of the built-in electromagnetic valve. The first electric current sensor $60_4$, the second electric current sensor $60_5$, and the third electric current sensor $60_6$, which are respectively provided for the intake valve 22b, the alarm LED 56, and the alarm buzzer 57, detect whether or not these components are energized.

The actuated condition detecting section 60 outputs a detection signal based on the detection result to the failure diagnosis section 65. Based on the detection signal, the failure diagnosis section 65 diagnoses a failure condition of the "engine component." Specifically, a threshold value is predetermined by the type of detection signal. If the magnitude of the detection signal inputted is equal to or greater than the predetermined threshold value, the subject "engine component" is diagnosed as normal. If the magnitude of the detection signal inputted is lower than the predetermined threshold value, the subject "engine component" is diagnosed as failure.

As shown in FIG. 4A, while the failure diagnosis section 65 is working, the failure location indicating display 70 indicates on the screen that the diagnosis is in progress. As shown in FIG. 4B, when the failure diagnosis is completed, the failure location indicating display 70 indicates the presence of a failure and a location where the failure has occurred. Looking at the screen display, the operator or occupant can repair the failure of the "engine component" or replace parts.

As described above, in preferred embodiments of the present invention, the actuation command section 67 outputs an actuation command for any "engine component" while the engine 16 is stopped. Based on the actuation command, the actuated condition detecting section 60 detects an actuated condition of the "engine component." Based on the detection result from the actuated condition detecting section 60, the failure diagnosis section 65 diagnose the presence of a failure in the "engine component." This allows the "engine component" to be actuated in a given manner, even while the engine 16 is stopped, thereby performing failure diagnosis of the subject "engine component."

In addition, in preferred embodiments of the present invention, the actuation command section 67 and the failure diagnosis section 65 are preferably provided in the ECM 45 which drives and controls the engine. This allows the failure diagnosis to be performed without connecting external equipment for diagnosis, such as a PC, to the ECM 45. Thus, no complicated procedures are involved, but quick failure diagnosis is achieved.

Further, in preferred embodiments of the present invention, the male connector 66a and the female connector 66b, which are provided to a portion of the wire harness 55, define the diagnosis start switch 66 as a "switch mechanism." Alternatively, a press-down diagnosis start button 71 may be provided as a "switch mechanism" at the operator's seat on the hull 11 (see a phantom line in FIG. 1). The diagnosis start button 71 is connected to the ECM 45 in a state where a signal is transmittable (see a phantom line in FIG. 3). When being pressed down, the diagnosis start button 71 sends a signal to the ECM 45, so that the actuation command section 67 outputs an actuation command signal.

While in the foregoing preferred embodiments, the outboard motor 12 is preferably used as the "watercraft propulsion unit," the present invention is not limited to this, but it may be replaced by an inboard-outdrive engine.

In addition, while in the foregoing preferred embodiments, the engine failure diagnosis system is preferably applied to the watercraft 10, the present invention is not limited to this, but it may also be applied to any of automobiles, aircrafts, locomotives, generators and so forth which have at least an internal combustion engine. Further, while in the foregoing preferred embodiments, the reciprocating engine is used, the present invention is not limited to this. Alternatively, any type of engine is applicable, such as a rotary engine and a gas turbine engine.

The aforementioned preferred embodiments are described as examples, and this is not intended to limit the present invention to the particular preferred embodiments described above.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An engine control module for controlling an engine in an outboard motor, the engine control module comprising:
   a plurality of actuating circuits arranged to actuate a plurality of engine components while the engine is operating;
   an actuation command section arranged to output an actuation command for any of the plurality of engine components to be actuated while the engine is stopped; and
   a failure diagnosis section arranged to diagnose a failure in any of the plurality of engine components based on a detection result from any of a plurality of actuated condition detecting sections provided in the plurality of engine components; wherein the failure diagnosis section is arranged to perform the failure diagnosis without the engine control module being connected to external equipment.

2. The engine control module according to claim 1, wherein the actuation command section and the failure diagnosis section are provided in a microcomputer inside the engine control module.

3. The engine control module according to claim 1, wherein the actuation command section selects one of the plurality of engine components to be actuated from the plurality of engine components based on a number of times the actuation command is outputted.

4. The engine control module according to claim 1, wherein the actuation command section is arranged to output a signal to cause a corresponding one of the plurality of actuated condition detecting sections to detect an actuated condition of the actuated engine component.

5. An outboard motor comprising:
   the engine control module according to claim 1.

6. The outboard motor according to claim 5, wherein the engine control module is located inside the outboard motor.

7. The outboard motor according to claim 5, wherein the plurality of engine components include a plurality of different types of engine components, one of the plurality of different types of engine components includes a fuel injector, and a corresponding one of the plurality of actuated condition detecting sections includes a sound sensor arranged to detect an operating sound of the fuel injector while the engine is stopped.

8. The outboard motor according to claim 5, wherein the plurality of engine components include a plurality of different types of engine components, and the plurality of different types of engine components include a fuel booster pump, an ignition plug, and a fuel injector.

9. The outboard motor according to claim 5, wherein the plurality of actuated condition detecting sections include a first sound sensor arranged to detect an operating sound of the fuel booster pump, a light sensor arranged to detect an ignition light of the ignition plug, and a second sound sensor arranged to detect an operating sound of the fuel injector, all while the engine is stopped.

10. The outboard motor according to claim 5, further comprising a switch mechanism connected to the engine control module via a wire harness, wherein operation of the switch mechanism causes the actuation command section to output the actuation command.

11. A watercraft comprising:
    the outboard motor according to claim 5.

12. The watercraft according to claim 11, further comprising an alarm permanently connected to the engine control module and arranged to generate an alarm when the failure diagnosis section diagnoses the failure.

13. The watercraft according to claim 12, wherein the alarm includes an LED and/or a buzzer.

14. The watercraft according to claim 11, further comprising a visual display permanently connected to the engine control module and arranged to display which of the plurality of engine components has failed when the failure diagnosis section diagnoses the failure.

15. The watercraft according to claim 11, further comprising a switch mechanism connected to the engine control module via a wire harness, wherein operation of the switch mechanism causes the actuation command section to output the actuation command.

16. The watercraft according to claim 11, wherein the plurality of engine components include a plurality of different types of engine components, and the plurality of different types of engine components include an intake valve, an alarm LED, and an alarm buzzer.

17. The watercraft according to claim 16, wherein the plurality of actuated condition detecting sections include a first electric current sensor arranged to detect an energized state of the intake valve, a second electric current sensor arranged to detect an energized state of the alarm LED, and a third electric current sensor arranged to detect an energized state of the alarm buzzer, all while the engine is stopped.

18. The watercraft according to claim 11, wherein the plurality of engine components include a plurality of different types of engine components, the actuation command section actuates the plurality of different types of engine components simultaneously based on the actuation command, and the failure diagnosis section simultaneously diagnoses each of the plurality of different types of engine components.

19. The watercraft according to claim 11, wherein the plurality of engine components include a plurality of different types of engine components, and the actuation command section actuates the plurality of different types of engine components in a predetermined sequence based on the actuation command.

* * * * *